H. J. FELL.
COOKING APPARATUS.
APPLICATION FILED DEC. 1, 1911.
1,040,916.
Patented Oct. 8, 1912.
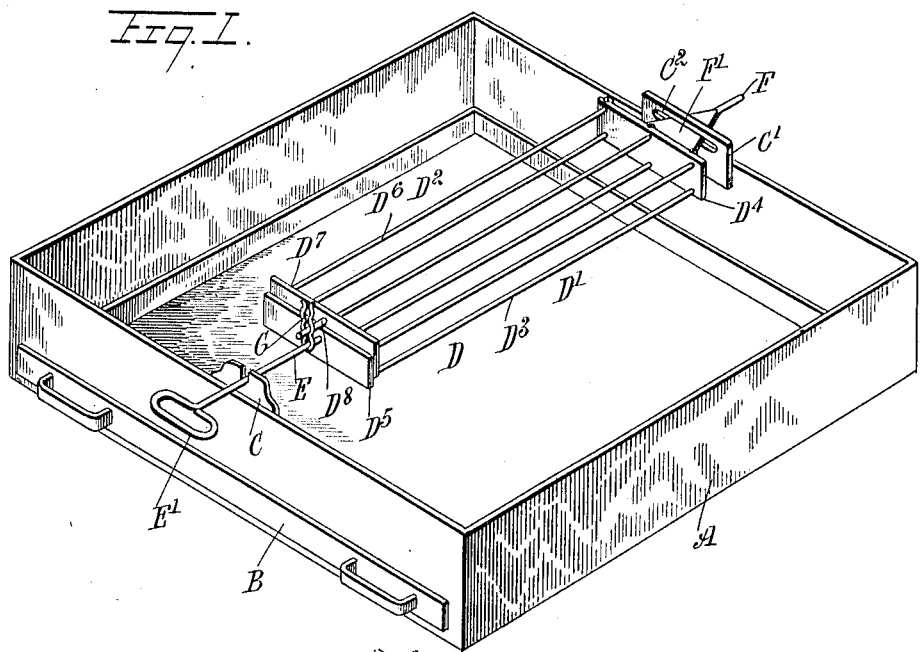
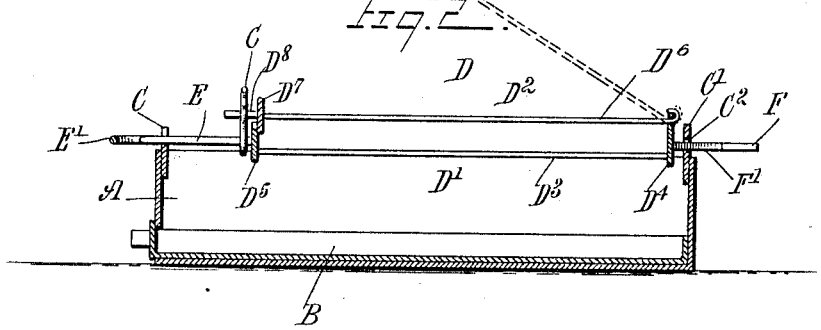
WITNESSES
INVENTOR
Harriet Julia Fell
BY
ATTORNEYS

UNITED STATES PATENT OFFICE.

HARRIET JULIA FELL, OF WHITE PLAINS, NEW YORK.

COOKING APPARATUS.

1,040,916.  Specification of Letters Patent.  Patented Oct. 8, 1912.

Application filed December 1, 1911. Serial No. 663,220.

*To all whom it may concern:*

Be it known that I, HARRIET JULIA FELL, a citizen of the United States, and a resident of White Plains, in the county of Westchester and State of New York, have invented a new and Improved Cooking Apparatus, of which the following is a full, clear, and exact description.

The object of the invention is to provide a new and improved cooking apparatus for broiling, toasting, or otherwise treating articles of food, and arranged to permit of conveniently holding the article of food in position in a holder or gridiron to allow of readily turning the holder or gridiron periodically and locking it in the adjusted position.

For the purpose mentioned, use is made of a pan provided with bearings, of which one is elongated and the other is open, and a gridiron having clamping members between which the article of food is held, the gridiron having trunnions engaging the said bearings, one of the trunnions having a handle for turning the gridiron and the other trunnion having a flattened portion for engagement with the said elongated bearing to lock the gridiron against turning.

A practical embodiment of the invention is represented in the accompanying drawings forming a part of this specification, in which similar characters of reference indicate corresponding parts in all the views.

Figure 1 is a perspective view of the cooking apparatus; Fig. 2 is a transverse section of the same; and Fig. 3 is a face view of the adjusting device, for holding the clamping members of the gridiron the desired distance apart according to the thickness of the article of food under treatment at the time.

A pan A of suitable size and material is provided in its bottom with a drawer B for collecting grease or other drippings from the article of food under treatment at the time. The front and rear of the pan A are provided at the top with bearings C, C', of which the bearing C is open and the bearing C' is provided with an elongated slot $C^2$, as plainly shown in Fig. 1. The bearings C and C' are adapted to support a gridiron or holder D provided with two clamping members D', $D^2$ for receiving the article of food between them and holding the same in position during the broiling or other cooking operation. The member D' of the gridiron D consists of spaced bars $D^3$ attached to end plates $D^4$, $D^5$, of which the end plate $D^5$ is provided with a trunnion E adapted to engage open bearing C and terminating in a handle E'. The rear plate $D^4$ is provided with a trunnion F having a flattened portion F' adapted to engage the elongated slot $C^2$ to hold the gridiron against turning. The member $D^2$ of the gridiron is provided with spaced bars $D^6$ hinged at their rear ends on the plate $D^4$ and attached at their forward ends to a plate $D^7$ provided with a pin $D^8$ adapted to be engaged by a locking key G held on the trunnion E and serving to hold the free end of the clamping member $D^2$ in position on the clamping member D'. The key G is preferably in the form of spring wire bent to form a number of openings for engagement with the pin $D^8$ so as to hold the clamping member $D^2$ more or less spaced from the clamping member D' according to the thickness of the article of food clamped between the two members D' and $D^2$.

In using the cooking apparatus, the gridiron D can be readily opened for placing the article of food between the members D' and $D^2$, by raising the latter as shown in dotted lines in Fig. 2 after which the free end of the member $D^2$ is fastened to the forward end of the member D' by the use of the key G. The gridiron is placed in position on the pan A by engaging the trunnion F with the opening $C^2$ and placing the trunnion E into the open bearing C. When the parts are in this position the gridiron can be readily turned to bring either side uppermost, and when this has been done the gridiron is pushed rearwardly so as to engage the flattened portion F' of the trunnion F with the elongated slot $C^2$ to hold the gridiron against turning for the time being.

After the article of food has been treated and it is desired to turn the same, it is only necessary for the operator to take hold of the handle E' and draw the gridiron forward, that is, until the flattened portion F' of the trunnion F is out of engagement with the elongated slot $C^2$, to permit the operator to turn the gridiron D and with it the article of food until the gridiron is reversed and with it the article of food, and then the operator pushes the gridiron rearwardly to reengage the flattened portion F' with the elongated slot $C^2$ with a view to hold the gridiron against turning. By suspending the gridiron above the drawer B, it is evident that the grease and other drippings from the article of food readily pass into the pan B, which can be withdrawn whenever desired for removal of the accumulated contents. It will also be noticed that the gridiron D can be readily removed from the pan for placing the article of food between the clamping members or removing it therefrom after the desired treatment is accomplished.

The cooking apparatus shown and described is very simple and durable in construction, and is not liable easily to get out of order.

Having thus described my invention, I claim as new and desire to secure by Letters Patent:

1. In combination with a pan having oppositely-disposed bearings of which one is elongated and the other is open at the top, a gridiron whose length is less than the distance between the bearings having clamping members between which the article of food is to be clamped, the gridiron having trunnions for engagement with the said bearings, and being movable in the direction of its length between the bearings, one of the trunnions having a handle and engaging the said open bearing, and the other trunnion having a flat portion for engagement with the said elongated bearing to hold the gridiron against turning.

2. A gridiron comprising a lower series of supporting rods, end plates rigidly connected to the ends of said rods and extending upwardly therefrom, trunnions extending centrally, and in opposite directions, from said end plates, an upper series of rods having a hinged connection at one end with the upper portion of one of said end plates, an end plate secured to the other ends of said upper series of rods whereby to constitute a frame movable upon said hinged connection with respect to the lower supporting rods and their end plates, said last-named end plate having a pin extending centrally therefrom and adapted to project parallelly above one of the said trunnions, when the said end plate is lowered in operative position, and a locking key comprising opposite clasping members secured to and projecting upwardly from the last-mentioned trunnion and adapted to receive the said pin between them.

3. In combination with a pan having oppositely disposed bearings of which one is elongated and the other is open at the top, a gridiron whose length is less than the distance between the bearings, and comprising a lower series of supporting rods, end plates secured at the ends of said rods, an upper series of rods having a hinged connection at one end with the upper portion of one of said end plates, an end plate secured at the opposite ends of said upper rods, whereby to form a frame movable vertically on said hinged connection with respect to the lower supporting rods and their end plates, means for normally holding said frame in a substantially parallel position above and with respect to the lower supporting rods and their end plates, said gridiron as a whole being shiftable between the said pan bearings and having trunnions movable through the said bearings, one of the said trunnions having a handle and being disposed in the open bearing, and the other trunnion engaging the elongated bearing and having a flattened portion which may be moved into registry, and out of registry, with the said elongated bearing, by shifting the gridiron.

In testimony whereof I have signed my name to this specification in the presence of two subscribing witnesses.

HARRIET JULIA FELL.

Witnesses:
ANNA EHRLICH,
CARL BARKHAUSEN.

---

Copies of this patent may be obtained for five cents each, by addressing the "Commissioner of Patents, Washington, D. C."